US009028642B2

(12) United States Patent
Taylor et al.

(10) Patent No.: US 9,028,642 B2
(45) Date of Patent: May 12, 2015

(54) METHOD, APPARATUS AND SYSTEM FOR LINING CONDUITS

(75) Inventors: Kevan Charles Taylor, Red Rock, TX (US); Wesley Earl Cobb, Jr., La Marque, TX (US)

(73) Assignee: Inland Pipe Rehabilitation, LLC, The Woodlands, TX (US)

( * ) Notice: Subject to any disclaimer, the term of this patent is extended or adjusted under 35 U.S.C. 154(b) by 2175 days.

(21) Appl. No.: 11/315,328

(22) Filed: Dec. 23, 2005

(65) Prior Publication Data

US 2006/0137816 A1 Jun. 29, 2006

Related U.S. Application Data

(60) Provisional application No. 60/638,402, filed on Dec. 27, 2004.

(51) Int. Cl.
*B29C 63/36* (2006.01)
*F16L 55/165* (2006.01)

(52) U.S. Cl.
CPC .............. *B29C 63/36* (2013.01); *F16L 55/1651* (2013.01); *F16L 55/1654* (2013.01)

(58) Field of Classification Search
CPC ... F16L 55/1654; F16L 55/1651; B29C 63/36
USPC ........................ 156/287, 294, 423; 138/97, 98
See application file for complete search history.

(56) References Cited

U.S. PATENT DOCUMENTS

| 2,935,777 A | 5/1960 | Perkins et al. |
| 4,009,063 A * | 2/1977 | Wood ............................ 156/294 |
| 4,064,211 A | 12/1977 | Wood |

(Continued)

FOREIGN PATENT DOCUMENTS

| EP | 0 620 100 A2 | 10/1994 |
| EP | 0620100 | 10/1994 |

(Continued)

OTHER PUBLICATIONS

Machine translation for Japan 07-232377 (no date).*

(Continued)

*Primary Examiner* — Jeff Aftergut
(74) *Attorney, Agent, or Firm* — Marshall, Gerstein & Borun LLP (57) ABSTRACT

A method for inverting a tubular liner in a hollow conduit involves: forming a cuff from the tubular liner, the cuff having an opening through which the liner is fed; and while feeding the liner through the cuff opening, feeding a gas under pressure through a gas inlet port formed in the liner to a space between the cuff and the remainder of the liner, thereby causing inversion and inflation of the liner into and through the conduit. After a portion of the liner has been inverted in the conduit, a region of the cuff and liner upstream of the gas inlet port is sealed off, thereby causing inversion of the remainder of the liner in the conduit. Optionally, before a trailing end of the liner is fed through the opening of the cuff, the trailing end is sealed to prevent flow of gas therefrom. When the liner is intended to line the conduit, the liner resin-impregnated either outside or in the conduit and, after complete inversion of the liner in the conduit, the resin is cured and the ends of the liner are sealed to the inside surfaces of the conduit. An apparatus and system for conducting the method are also provided.

7 Claims, 6 Drawing Sheets

(56) References Cited

U.S. PATENT DOCUMENTS

| | | | |
|---|---|---|---|
| 4,135,958 A | | 1/1979 | Wood |
| 4,350,548 A | * | 9/1982 | Zenbayashi et al. .......... 156/294 |
| 4,368,091 A | | 1/1983 | Ontsuga |
| 4,385,885 A | | 5/1983 | Wood |
| 4,401,696 A | | 8/1983 | Wood |
| 4,668,125 A | | 5/1987 | Long, Jr. |
| 4,685,983 A | | 8/1987 | Long, Jr. |
| 4,752,511 A | | 6/1988 | Driver |
| 4,948,452 A | | 8/1990 | Morinaga |
| 5,044,405 A | | 9/1991 | Driver |
| 5,154,936 A | | 10/1992 | Driver et al. |
| 5,223,204 A | | 6/1993 | Endoh |
| 5,358,359 A | * | 10/1994 | Long, Jr. ...................... 156/294 |
| 5,374,174 A | * | 12/1994 | Long, Jr. ...................... 156/294 |
| 5,622,571 A | | 4/1997 | Derlein |
| 5,676,175 A | | 10/1997 | Bar et al. |
| RE35,944 E | | 11/1998 | Driver |
| 5,855,729 A | * | 1/1999 | Kiest et al. .................... 156/423 |
| 5,927,341 A | | 7/1999 | Taylor |
| 5,969,234 A | | 10/1999 | Weigele |
| 6,170,531 B1 | | 1/2001 | Jung et al. |
| 6,354,330 B1 | | 3/2002 | Wood |
| 6,354,334 B1 | | 3/2002 | Ellyin et al. |
| 6,390,795 B1 | | 5/2002 | Waring et al. |
| 6,539,979 B1 | * | 4/2003 | Driver .......................... 156/287 |
| 6,641,687 B2 | | 11/2003 | Kiest, Jr. et al. |
| 6,679,293 B2 | | 1/2004 | Driver |
| 6,682,668 B1 | | 1/2004 | Driver |
| 6,708,728 B2 | | 3/2004 | Driver et al. |
| 6,827,526 B2 | | 12/2004 | Warren |
| 6,837,273 B2 | | 1/2005 | Woolstencroft |
| 6,960,313 B2 | * | 11/2005 | Waring et al. ............... 264/36.17 |
| 7,476,348 B2 | * | 1/2009 | Waring .......................... 138/97 |
| 2003/0209823 A1 | * | 11/2003 | Waring et al. ............... 264/36.17 |
| 2003/0234057 A1 | | 12/2003 | Woolstencroft |
| 2005/0098909 A1 | * | 5/2005 | Kiest, Jr. ..................... 264/36.17 |
| 2006/0093436 A1 | | 5/2006 | Gearhart |
| 2008/0072982 A1 | * | 3/2008 | Driver et al. .................... 138/98 |
| 2010/0122767 A1 | * | 5/2010 | Taylor et al. .................. 156/294 |

FOREIGN PATENT DOCUMENTS

| | | | |
|---|---|---|---|
| GB | 1044645 | | 10/1966 |
| GB | 2021728 | | 12/1979 |
| JP | 55-49223 A | * | 4/1980 |
| JP | 63-039321 | * | 2/1988 |
| JP | 01-242231 | * | 9/1989 |
| JP | 07-232377 A | * | 9/1995 |
| JP | 09-048073 | * | 2/1997 |
| JP | 2000-211026 A | * | 8/2000 |

OTHER PUBLICATIONS

Machine translation for Japan 2000-211026 (no date).*
Translation for Japan 01-242231 (no date).*
International Search Report, PCT/US2005/046958, Apr. 27, 2006.
Written Opinion of the International Searching Authority, PCT/US2005/046958, Apr. 26, 2006.
Summary of Office Action for Mexican Application No. MX/a/2007/007912, dated Jul. 13, 2012.

* cited by examiner

METHOD, APPARATUS AND SYSTEM FOR LINING CONDUITS

This application claims priority to U.S. Provisional Application No. 60/638,402, filed Dec. 27, 2004, which is hereby incorporated by reference herein.

BACKGROUND OF THE INVENTION

The present invention relates to methods, apparatus or equipment and systems for lining conduits, e.g., preferably subterranean pipelines and passageways, such as sewers, with a liner impregnated with a curable resin in order to secure the conduit against ingress or egress of liquids.

Subterranean passageways that have been in use for many years tend to become permeable, thus permitting fluids to seep into and out of the passageways. The necessary repair of such passageways is both an expensive and time-consuming operation. Systems of lining passageways that use a fabric impregnated with curable resin have been used for a number of years. Such systems and methods of lining passageways are disclosed, for example, in U.S. Pat. Nos. 4,009,063; 4,064,211; 4,135,958; 4,685,983; 4,668,125; 6,679,293; 5,154,936; Re. 35,944; 6,390,795; 4,752,511; 5,044,405; 6,708,728; 6,354,330; 6,682,668; 6,827,526; 6,641,687; and 5,969,234. Each of the foregoing references are incorporated by reference herein.

U.S. Pat. No. 4,009,063 to Wood discloses a method of lining a passageway, wherein a tubular fibrous felt is immersed at the passageway site in a thermosetting resin. The resulting resin-impregnated felt has an inflatable tube therein which is inflated to shape the resin to the passageway surface. As the tube is lowered into the passageway (e.g., a sewer), the tube is pulled along the passageway by winding up a rope attached to a leading end of the tube onto a hand winch. The tube can be inflated, e.g., with air under pressure from a fan or blower. With the tube so inflated, the uncured resin is either allowed to cure naturally or is cured under the action of heat depending upon the type of resin used. The resin is cured to form a hard, rigid lining pipe with the felt embedded therein.

U.S. Pat. No. 4,064,211 to Wood discloses a method for lining passageways, wherein a resin-impregnated foam or felt in the form of a flattened tube liner is anchored at one end of a passageway and fed into the passageway being turned inside out as it is fed in. Before the liner is turned inside out, it is supported buoyantly by liquid, e.g., water, which serves to carry the liner. The liquid also forces the tube to roll inside out in the passageway, the uneverted portion being suspended in the liquid. When the tube is partially filled with and floats on the liquid, the remainder of the tube may be filled with air under pressure. After the complete lining of the passageway, an outer barrier layer of the tube may be removed therefrom.

U.S. Pat. No. 4,135,958 to Wood discloses a method of lining a passageway with a resin absorbent tube, involving causing a tube of resin absorbent material to evert into the passageway by applying fluid pressure to the interior of the everted tube to force the uneverted portion of the tube to move into the passageway through the everted portion of the tube; causing a reservoir of resin to be located in the uneverted portion of the tube which is just behind the portion of the tube that is everting into the passageway, whereby the resin absorbent material is soaked by the resin in the reservoir just before that material everts; and supporting the uneverted tube at the location of the reservoir of resin by means that move along the passageway as the tube everts, e.g., a balloon or gas-filled bag.

U.S. Pat. No. 4,685,983 to Long, Jr. discloses a method and apparatus for installing a flexible tubular liner into a pipe, wherein the apparatus includes means for defining a pressurized region for inserting the liner into the pipe and an insertion conduit, having an entry end and exit end connected to the means defining the pressurized region. Means are provided on the exit end of the insertion conduit for sealing and clamping the leading end of the liner to the exit end of the insertion conduit and for creating a fluid tight seal between the liner and the insertion conduit. The liner is installed within a sewer pipe by securing the leading end of the liner to a fixed structure adjacent to one end or within the sewer pipe and by inverting the liner or turning the liner inside out along the length of the sewer pipe. Once the liner reaches the halfway point in the insertion process, all of the liner is located within the sewer pipe. The apparatus functions to insert the liner within the sewer pipe using fluid pressure, which can be a combination of water pressure and air pressure. Air pressure is made to act upon a column of water placed in the insertion conduit to push downwardly a cuffed leading edge of the liner, thereby causing the liner to invert and move the turned back portion of the liner toward the left along the sewer pipe. Pressurized fluid flows through the pressure conduit to facilitate the bending of the liner through the diversion angle. The inversion and movement of the liner along the sewer pipe continues until the inversion end reaches and abuts against a stop means which has been placed inside of the sewer pipe at the end of the section of pipe to be lined. Static water pressure forces the liner radially outwardly against the walls of the sewer pipe. Hot water is pumped through a hot water pipe into the hose which extends along the length of the liner. Through this circulation process, the water temperature within the liner is slowly raised to a temperature sufficient to effect curing of the liner resin.

U.S. Pat. No. 4,668,125 to Long, Jr. discloses a self-contained, transportable apparatus for inserting a flexible liner into a pipe, wherein the apparatus includes an inversion means or insertion conduit, and means for sealingly clamping a leading end of the liner with a fluid tight seal to the insertion conduit or inversion means. The apparatus further includes a water pipe secured to one side of the insertion conduit and adapted to be connected to a source of water, and a plurality of water valves located along the length of the water pipe to control the flow of water through the water pipe. During use of the apparatus, the leading end of the liner is moved down the insertion conduit until it extends out of the exit end of the pipe. The leading end of the liner is then turned inside out for the first six inches to form a cuff which is pulled back over the outside of the insertion conduit exit end and is secured using a clamping means. The water valves are then opened to allow water to flow through the water pipe and to enter the top of the insertion conduit. Because the leading end of the liner is secured to the insertion conduit exit end, the water will be contained within the insertion conduit and will fill the insertion conduit. As the water pressure within the insertion conduit builds up to a predetermined level, the water pressure causes the liner to invert and move along the pipe. The water continues to flow into the insertion conduit to maintain the water pressure at a level sufficient to move the liner along the pipe. When a trailing end of the liner reaches the insertion conduit entry end, the operation is stopped and a rope is secured to the trailing end of the liner. When the liner has been completely inverted and inserted into the pipe, the liner is cured.

U.S. Pat. No. 6,679,293 to Driver discloses a process for lining an existing pipeline with a flexible resin impregnated cured in place liner by pulling in the liner and inflating an eversion bladder with air and curing the liner with flow-through steam without loss of pressure. The bladder is everted by means of pressurized air. Steam is introduced into the bladder to cure the resin, after which the bladder is removed.

U.S. Pat. No. 5,154,936 and Re. 35,944, both to Driver et al., disclose a tube eversion apparatus for use in lining passageways, e.g., underground sewer pipes, wherein the apparatus is composed of a housing having an open top and an open bottom through which a tube to be everted can pass. The housing is composed of first and second chambers communicating with one another by a passage defined at least in part by a flexible wall, through which passage the tube is adapted to pass with the flexible wall in engagement therewith. The housing further includes a third chamber with the flexible wall defining a surface thereof. The housing also contains a means for supplying fluid to the first chamber, means for supplying fluid at an elevated pressure to the second chamber, thereby to evert the tube out from the apparatus, and means for supplying fluid at an elevated pressure to the third chamber, thereby to press the flexible wall against the tube as the tube moves through the passage, so as to substantially separate the first and second chambers and to retain the elevated fluid pressure in the second chamber. The flexible wall may extend substantially completely around the passage, thereby forming a sphincter valve which is moved to a closed, tube-engaging position by the fluid pressure in the third chamber. The fluid used to provide the pressure to evert the tube is preferably water. The pressure provided to the third chamber is preferably air pressure and is selected to effectively substantially seal off the upper end of the third chamber (thus separating the first and second chambers) while permitting the tube to slide therethrough.

U.S. Pat. No. 6,390,795 to Waring et al. discloses an apparatus for use in installing a liner in a conduit as part of a repair procedure, wherein the apparatus includes a sealing inlet port for passage of the tubular liner into an enclosed zone where an increased fluid pressure is maintained to move the tubular liner into the conduit and to evert it as it moves along the conduit. The apparatus also includes a container for holding air or another fluid under pressure to act on the flexible tube. The sealing inlet port is provided in the container to allow the liner to enter the container in a flattened configuration without significant loss of pressure, so that the pressure of the fluid in the container can be used to evert and extend the tubular liner into the required position within a conduit.

U.S. Pat. No. 4,752,511 to Driver discloses a method and apparatus for sealing the space between a pipe and a lining applied to the pipe's interior, wherein sealing rings are provided between the lining and the pipe to prevent fluid from passing through spaces between the pipe and the lining. The patent further teaches that water or other fluid is used to evert the liner into and along the interior of the pipe.

U.S. Pat. No. 5,044,405 to Driver et al. discloses a method and apparatus for repairing short sections of pipe by lining them. The patent teaches that patch type repair is accomplished by locating the lining within a carrier which is inserted into the pipe to be repaired and moved to a position adjacent the length to be lined. The lining is then moved out from the carrier into position within the pipe, with the carrier providing means for pressing the lining against the interior of the pipe and causing it to assume final form. After the lining is formed in situ, the carrier is separated therefrom and removed from the pipe, reading for reuse. To remove the lining from the carrier, fluid pressure is applied to the liner to cause it to evert and move away from the carrier.

U.S. Pat. No. 6,708,728 to Driver et al. discloses a "pull in and inflate" method for lining a pipeline with a flexible resin impregnated cured in place liner. Liner is pulled into a pipeline section to be relined by pulling in the liner and inflating an eversion bladder with air and curing the liner with flow-through steam introduced in the bladder. After curing is completed, the bladder is removed.

U.S. Pat. No. 6,354,330 to Wood discloses a method of lining a pipeline with a lining tube or resin absorbent material impregnated with a curable synthetic resin, wherein a lining tube is inserted into the pipeline and urged by pressure against the pipeline and heat is applied in stages to lengths of the lining tube. Water is used to evert the lining tube in the pipeline.

U.S. Pat. No. 6,682,668 to Driver et al. discloses a process for lining an existing pipeline with a flexible resin impregnated cured in place liner by pulling in the liner and inflating it with a reusable endless inflation bladder. The bladder is everted by means of water.

U.S. Pat. No. 6,827,526 to Warren discloses an assembly for installing a pipe liner within a sewer pipe, wherein the assembly includes a launcher defining a passage through which the pipe liner and a bladder pass during installation into a branch line sewer pipe. An inflatable member is mounted to an outer diameter of the launcher and is actuatable between an inflatable condition and a deflated condition. The inflatable member defines an airtight cavity into which air is introduced by way of an air inlet. A carrier tube is attached to the launcher body to provide protected passage for the pipe liner and bladder tube. A seal is provided between the launcher and the carrier tube. During installation of the pipe liner into a sewer pipe, the bladder is cuffed around the inflatable member and clamped around the outer surface of the launcher, and the pipe liner is then cuffed over the inflatable member on the outside of the bladder. The pipe liner is impregnated with a curable resin before being installed onto the launcher. The launcher is then attached to a positioning device (e.g., a rotating/lifting machine or a system of cables including pulleys and cables attached to the launcher and operated to pull and guide the launcher) for movement into position within the sewer pipe. The positioning device and the launcher are inserted into the main line of the sewer pipe and the launcher is positioned relative to a discrete location within the sewer pipe. The inflatable member is then inflated to trap the bladder and the pipe liner against the inner surface of the pipe. Air pressure is then applied to the bladder through the carrier tube to drive the bladder and the pipe liner into the main line sewer pipe, which causes the entire length of the pipe liner to be drawn through the passage defined in the launcher. The inflatable member is then deflated, but the bladder remains inflated until the pipe liner hardens. Once the pipe liner hardens, the bladder tube is deflated and the launcher removed from the sewer pipe.

U.S. Pat. No. 6,641,687 to Kiest, Jr. discloses a pipe repair apparatus which includes an outer carrier tube, an inner bladder tube within the carrier tube, and a repair sleeve within the bladder tube. The bladder tube and the carrier tube are formed by one unitary tube which is folded back upon itself. A wick extends from the repair sleeve to the rear end of the bladder tube and permits evacuation of gases from the bladder tube when the bladder tube is flattened by a vacuum during insertion of a curable resin into the bladder tube at its forward end. The bladder tube can be inverted out of the carrier tube so as to place the repair sleeve in contact with an area to be repaired within a sewer pipe.

U.S. Pat. No. 5,969,234 to Weigele discloses an apparatus for repairing and/or leakage testing of sewer pipes, wherein the apparatus is constructed as a tubular member surrounded by an elastic element, the apparatus further having an opening and a bladder. The bladder can be expanded by means of an arbitrary medium, e.g., gas, air, or a liquid. Supporting wheels permit movement of the apparatus inside the sewer pipe. For repair of a damaged connecting point of a connecting pipe adjoining a sewer pipe, the opening in the apparatus is aligned with the damaged connecting point. An interspace in the apparatus is filed with a medium, e.g., air, thereby causing the elastic element to expand and fill up the interspace. The elastic element bears against the sewer pipe inner wall and moves the apparatus up against the sewer pipe inner wall. The bladder is moved out through the opening into the connecting pipe and inflated, thereby causing the bladder to bear against the inner wall of the pipe and form a seal. Filler is then pressed into the region of the damaged connecting point and cured. The bladder is then reeled back into the tubular member of the apparatus and the medium is let out of the interspace, thereby causing the tubular member to sink downward.

A drawback to many current pipe-lining systems is the need to halt the operation in order to change the bladder or seal in the equipment if ripped or punctured during the installation. In addition, the existing systems are limited to specific diameter ranges and bladders that have to be removed after installation; therefore, more equipment, labor and time are required to make repairs for passageways of varying diameters.

It is desirable, therefore, to provide a method and apparatus for installing a liner without any bladder into any diameter of subterranean passageways in any direction or grade that is used to carry liquids or gas, such as sewage, in which the interruption of the passageway is minimized.

The present invention is directed to improvement in production and performance over current water-based commercial methods through use of air over liquid. The present method and apparatus are versatile because they accommodate all various sizes and contours as well as variation of that along the length of the pipe to be lined. Furthermore, increased productivity can be simply achieved by replacing the apparatus (after installation) with a blanking plate and moving the device to another location. The invention is also directed to rehabilitation of manholes due to the ease in which the liner can be installed vertically. Improved lining material is also envisioned. Re-lining of pipe systems is not impeded relative to the slope of the pipe, that is, inversion is not impeded by traversing the liner uphill or downhill through the pipe system. Utilization of the liner without use of bladders and liquid reduces installation costs, specifically reducing labor and equipment costs. Furthermore, the apparatus utilized in the method facilitates set-up and reduces the time during which the pipe is being serviced. Processing of the liner is improved because heating is more uniform compared to liquid processes during the shorter processing time. Also, the time for reducing the temperature after the catalyst is activated in the liner is significantly reduced. The apparatus is simplified over known equipment and avoids the use of a circulation mechanism. The present method avoids what are known as "soft ends", "hold back rope", and "bulk heads".

SUMMARY OF THE INVENTION

The present invention is directed in part to a method for inverting a tubular liner in a hollow conduit, particularly a subterranean passageway or pipeline, e.g., a sewer pipe, storm drain, and the like. In addition, the present invention is directed to a method for lining a hollow conduit with a resin-impregnated tubular liner, an apparatus for inverting a tubular liner in a hollow conduit, and a system for lining a hollow conduit with a resin-impregnated tubular liner. The methods are much simpler and faster than conventional methods for inverting a liner in a conduit and for lining a conduit. The methods, apparatus and system of the invention require no bladder system or seal external to the liner as a material aspect of the inventiom. In addition, a single apparatus can be used for all conduit diameters. The methods, apparatus and system of this invention also minimize the time at which the conduit must be closed during installation and curing of the liner.

Broadly, the method for inverting a tubular liner in a hollow conduit according to the present invention involves:
 (a) forming a cuff from a leading end of a tubular liner and securing the cuff, the cuff having an opening and being disposed outside of the conduit;
 (b) feeding a remainder of the liner through the opening of the cuff;
 (c) forming a gas inlet port in the cuff;
 (d) while feeding the liner through the opening of the cuff, feeding a gas (preferably air) under pressure through the gas inlet port formed in the cuff to a space between the cuff and the remainder of the liner that is being fed through the opening of the cuff, thereby causing inversion and inflation of the liner that has been fed through the opening of the cuff;
 (e) after a portion (preferably about one-half) of the liner has been inverted in the conduit, sealing a region of the cuff and the liner upstream of the gas inlet port, thereby causing inversion of the remainder of the liner fed through the opening in the cuff; and
 (f) optionally, before a trailing end of the liner is, fed through the opening of the cuff, sealing off the liner at a trailing end thereof to prevent flow of gas therefrom.

The method for lining a hollow conduit with a tubular liner in accordance with the present invention broadly involves:
 (a) providing a tubular liner having a leading end;
 (b) forming a cuff from the leading end of the liner, the cuff having an opening and being located outside of the conduit;
 (c) securing and positioning the cuff of the tubular liner before a first access opening of the conduit;
 (d) providing a gas inlet port in the cuff;
 (e) feeding a remainder of the liner through the opening of the cuff;
 (f) while feeding the remainder of the liner through the opening of the cuff, feeding gas under pressure through the gas inlet port into a space defined between the cuff and the remainder of the liner, the gas exerting pressure against a bottom surface of the space between the cuff and the remainder of the liner, thereby causing inversion and inflation of the liner into the conduit;
 (g) after a portion of the tubular liner has been inverted in the conduit, restricting a region of the cuff and the liner upstream of the gas inlet port so that gas passing through the gas inlet port is substantially prevented from escaping to atmosphere through the restricted region, wherein the gas passing through the gas inlet port is forced by the sealed region of the liner to flow through an interior portion of the liner, thereby causing inversion and inflation of a remainder of the liner fed through the opening in the cuff;
 (h) optionally, before a trailing end of the liner is fed through the opening of the cuff, closing the liner at a trailing end thereof to prevent flow of gas therefrom;
 (i) after completion of the inversion of the liner in the conduit, maintaining or establishing a pressure in an interior portion of the inverted liner such that the pressure is sufficient to keep the liner against the inside surface of the conduit;
 (j) curing the resin in the liner; and
 (k) sealing leading and trailing ends of the cured liner to the inside surface of the conduit.

In the method of this invention for lining a hollow conduit with a tubular liner, the liner is impregnated with resin either before or after the liner is inserted in the conduit.

The methods of this invention are preferably carried out in the absence of a bladder. The gas is preferably air or steam and the pressure of the gas is preferably from about 0 to about 30 pounds per square inch (psi). Operation at atmospheric pressure requires a supplemental force to invert the liner.

Once the liner is fully disposed within the conduit, the methods of this invention may further include the step of sealing off the opening of the liner cuff (e.g., with a blank plate and moving the apparatus to another location to facilitate additional installations) and then proceeding with the remaining steps of the methods.

The conduit can be, for example, a water or gas pipe, a storm drain, a sewer pipe, a wastewater drain, or the like.

The apparatus of the present invention for inverting a tubular liner in a conduit broadly contains:

- a feeding member for receiving and feeding a tubular liner into a conduit;
- a securing element located downstream of the feeding member and being adapted to secure an opening of a cuff formed from a leading end of the tubular liner fed through the feeding member;
- a liner-closing member (preferably, a piston) located beneath the securing element;
- a gas-inlet connector located downstream of the liner-closing member; and
- optionally, a control member for actuating the liner-closing member.

The above-described apparatus is also used to line a conduit with a tubular liner in accordance with the method of the invention.

The apparatus of this invention is preferably bladderless. The feeding member is preferably composed of a single roller or a pair of rollers, the roller or rollers being rotatably mounted on a support frame.

The present invention also comprises a combination of components with the above described apparatus. The additional components include known apparatus to generate steam and pressurized gas, a resin impregnation unit, a monitoring unit and a refrigeration unit to facilitate the above method.

DETAILED DESCRIPTION OF THE INVENTION

In the method of the present invention, a resin-impregnated fabric tubing liner or pre-liner (non-resin-impregnated tubing) is drawn through the entrance of the apparatus of this invention sufficiently to allow the first few feet of the liner to be exposed inside out from the exit point of the apparatus. The first few feet of the liner to be exposed inside out from the exit point of the apparatus is preferably at least about 7 feet, more preferably from about 7 feet to about 15 feet, most preferably from about 10 feet to about 15 feet. The liner tube is slit on either side thereof, the length of the slit being about 2 feet or a length sufficient to allow the operator to grip and pull the liner back on itself for the first 7 feet (or other length of liner that is to be exposed inside out from the exit point of the apparatus).

After the first few feet of the liner is exposed inside out as described above, a connector is attached to the liner tube. The connector is a tube manufactured with an internal thread and an external thread. After forming a small, circular hole through the layers of the liner tube, the operator inserts the connector tube into the hole far enough for a large retaining washer to be placed on the tube portion extending through the hole. The retaining washer is serrated one side and smooth on the other side. The washer is placed on the tube portion such that the serrated side of the washer is closest to the liner. The washer and the tube portion are then secured using a large retaining nut on each side, which are then tightened inwardly to each other, encapsulating the liner.

Generally, in the method of this invention, the connector is attached to the liner tube to permit insertion of water or air to assist the inversion process. Lubricants can also be introduced through the connector.

After the connector is attached to the liner tube, a length of impregnated fabric tubing is inserted into a conduit from a single access point. The ability to control the opening or closing of the apparatus automatically or manually allows pressure to build up or be reduced and thereby assists in the speed of the inversion or installation of tubular fabric into the conduit. The ability to close the entrance point of the apparatus allows internal pressure to be controlled, which in turn forces the impregnated tubing into contact with the walls of the conduit to form a liquid-tight seal therebetween and to conform to the shape thereof.

With the apparatus in the restricted position, air or fluid is forced under pressure through the connector, causing the liner tube to expand, which in turn pulls remaining liner through itself (inversion). An opening of the apparatus can be adjusted to reduce friction forces, which in turn can slow or accelerate the process of inverting the liner tube through and into the passageway or pipeline to be repaired or lined.

Internal pressure of the liner tube against the wall of the conduit to be lined is maintained by air or fluid flowing through the connector into the liner tube, thereby forcing the tube to conform to the shape of the existing passageway or pipeline. This same internal pressure causes the liner tube to pull remaining liner tube through itself, thereby propelling or inverting itself further into the conduit. When the tube has reached the halfway stage of the intended length for the installation, the tail or tube end is visible at the entrance point to the apparatus. As the tail travels past the entrance point, the apparatus may then be closed and the continued application of force through the connector will cause the remaining liner tube to be fully inverted through the conduit, thereby completing the installation process.

Once in its final position, the resin-impregnated liner can then be cured at ambient temperature or optionally by heat applied from a source such as hot air, steam or fluid supplied to the liner following through the connector. In a preferred embodiment of the present invention, the resin in the liner is cured by introducing air/steam or hot water into and through the liner tube connector while maintaining sufficient pressure to overcome all or any external pressure from the ground. The resin may be allowed to cure at an elevated ambient temperature since the air is introduced under pressure or the air contained between the liner may be heated by introducing hot air or steam. Additionally, hot water can be introduced into the conduit via the connector.

The liner used in the present invention preferably has a thickness of at least 3 millimeters. Particularly suitable thicknesses range from about 3 millimeters up to about 25 millimeters. The diameter of the liner is at least 6 inches, with particularly suitable diameters ranging from about 6 inches to, e.g., 146 inches.

The liner or sleeve used in the present invention can be formed of a dry (non-impregnated) fabric or resin-impregnated fabric. The fabric can be impregnated with resin according to known methods. Reference is made, e.g., to U.S. Pat. No. 4,009,063 to Wood, which is incorporated by reference herein.

The fabric forming the lining may be formed from at least one layer of resin absorbent material, such as felt or glass fiber or a combination of both. The resin impregnating the fabric is preferably a synthetic thermosetting resin, of an ambient type cure, which means that it will cure with the passage of time, which may be several hours, or has other catalyst additives which allows for the curing at a specific temperature range.

Liners for use in the present invention may be composed of any resin absorbent fabric and impregnating resin conventionally used to form liners for underground conduit systems. Impregnating conduit or pipe liners with a curable resin is known in the pipe-lining art and those skilled in the art would recognize that many different methods of impregnating pipe liners are within the contemplation of this invention. Particularly suitable materials for forming conduit liners of improved strength are disclosed, e.g., in U.S. Pat. No. 6,837,273 and U.S. Published Application No. 2003/0234057, both of which are incorporated by reference herein. These references disclose fabric layers which are sewn or bonded and which contain a natural or synthetic fibrous material in needled, knit, woven or non-woven mat form. Suitable materials should be water- and corrosion-resistant. Examples of fibers for such fabrics include pulp fiber, hemp, cotton, polyethylene, polypropylene, rayon, nylon and/or polyester fibers. The references also teach that woven or non-woven glass material can be used in addition to, or as a substitute for, these other fibers. The references further teach that the resinous impregnation liquid introduced into the fabric layers can be any number of thermosetting or thermoplastic compositions which can be introduced by dipping, injecting, extruding, or painting, for example. The resinous impregnation liquid becomes set or hardened by light or heat to provide a solid matrix around the fibers. Suitable thermoplastic compositions include thermoplastic polyvinyl chloride, polyolefins, and the like. Suitable thermosetting resins can include those containing a heat-activatable curing agent, a light-activatable agent, a curing agent, or a heat deactivatable curing retarding agent. Such examples include ultraviolet curing unsaturated polyester, such as disclosed in U.S. Pat. No. 6,170,531 (incorporated by reference herein), e.g., vinyl ester, epoxy, and thermosetting polyester.

When a thermosetting resin is used to impregnate the liner, it is desirable to maintain the resin at a reduced temperature in order to retard the curing process until the liner is fully inserted into the conduit. To maintain the resin impregnated liner at such a reduced temperature, the liner is initially cooled at the centralized liner preparation facility. During storage and/or transportation of the resin impregnated liner from the liner preparation facility and the conduit to be lined, the liner is preferably kept under refrigeration. In this way, the liner can be transported a substantial distance to a remote job site without any substantial curing of the resin during transport. By using a centralized facility for the preparation of the liner, the same equipment can be used to impregnate and otherwise prepare liners concurrently for different jobs at widely separated job sites.

Suitable resin concentration in the impregnated liner is determined at least in part by the natural ability of the fabric material to absorb the various resin liquids used in the impregnation, which also depends on the viscosity and temperature at which the impregnation and the rate of impregnation can occur. These rates will change depending on the materials, resin (e.g., resin viscosity) and fabric (e.g., fabric density) used.

The method and apparatus of this invention can be used to line a conduit (e.g., passageway or pipeline) of various shapes and dimensions regardless of disposition of the conduit to be repaired or lined. Non-limiting examples of suitable conduits to be lined according to the present invention include those having a diameter of at least 24 inches, preferably from about 24 inches to about 54 inches, and those having a length of at least 300 feet, preferably from about 300 feet to about 900 feet. However, it is to be understood that the present invention is not restricted due to the dimensions of the conduit.

The conduit to be lined preferably extends between two access locations. A restriction valve secured through the fabric at the other end of the liner at the second access point is used to control the internal pressure of the liner or can be used to assist in the circulation of hot water from the entrance point through the liner and returned back to the heat source. The second valve can be controlled manually or automatically, thereby relieving or restricting the internal pressure holding the liner into shape along the entire length of the conduit.

Embodiments of the apparatus and system of this invention and the various stages of the methods of the present invention will now be described with reference to FIGS. 1-5.

An embodiment of the apparatus within the scope of this invention is designated by reference numeral 4 in FIGS. 1-4. The conduit to be lined e.g., a sewer pipe, is designated by reference numeral 10 and has a first access opening in the form of a manhole 1, a second access opening in the form of a manhole 2, a first vertical channel 10A, a second vertical channel 10B and a horizontal channel 10C disposed between the first and second vertical channels. It is to be understood that conduits of various geometries and diameters can be lined using the methods, apparatus and system of this invention.

Figure 1A:
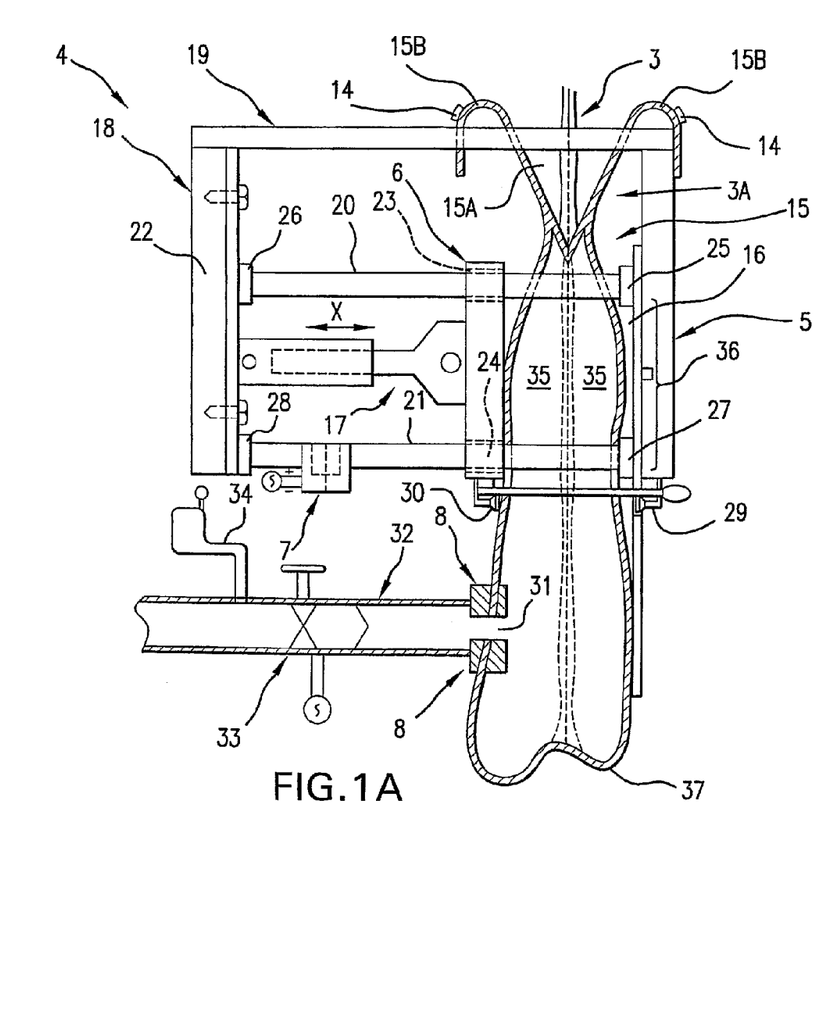
FIG. 1A is a schematic illustration of the apparatus of the invention used in conjunction with a liner and of a first stage of the method of the invention.
Figure 1B:
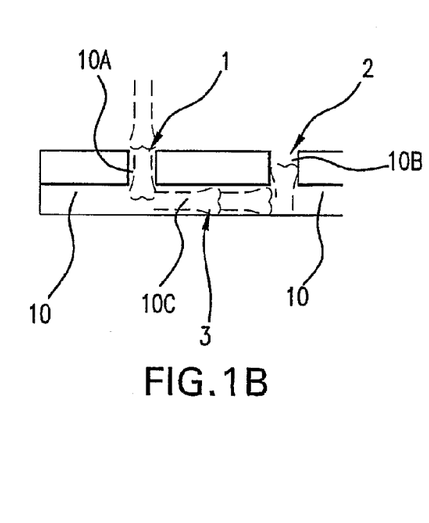
FIG. 1B is a schematic illustration of a conduit which is to be repaired using the apparatus shown in FIG. 1A.

Apparatus 4 includes a conventional feeding member (not shown) for receiving and feeding a tubular liner 3 into conduit 10, a securing element 14 located downstream of the feeding member and being adapted to fixedly secure an opening 15A of a cuff 15 formed from a leading end 3A of liner 3; an area 16 located downstream of securing element 14; a liner-closing member 17 located in area 16, and a gas-inlet connector 8 located downstream of liner-closing member 17.

Figure 2:
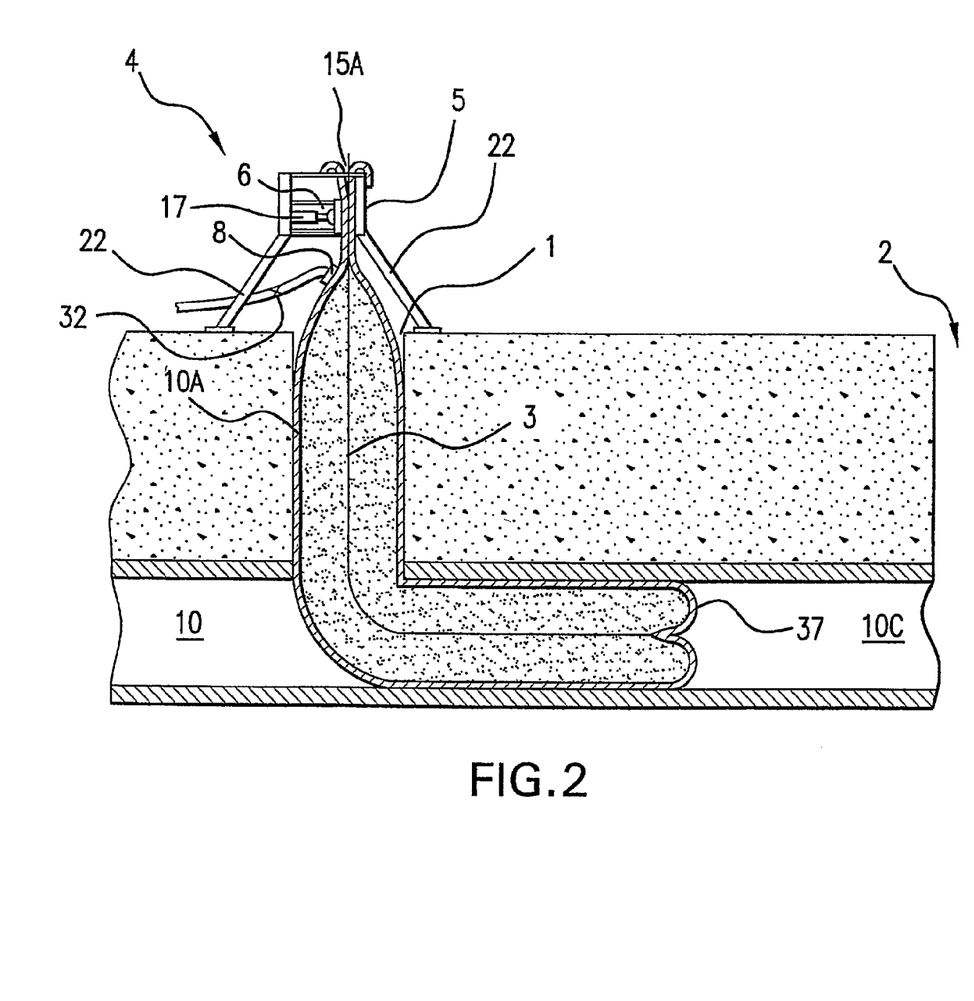
FIG. 2 is an illustration of a second stage of the method of the invention, using the apparatus shown in FIG. 1A and the conduit shown in FIG. 1B.
Figure 3:
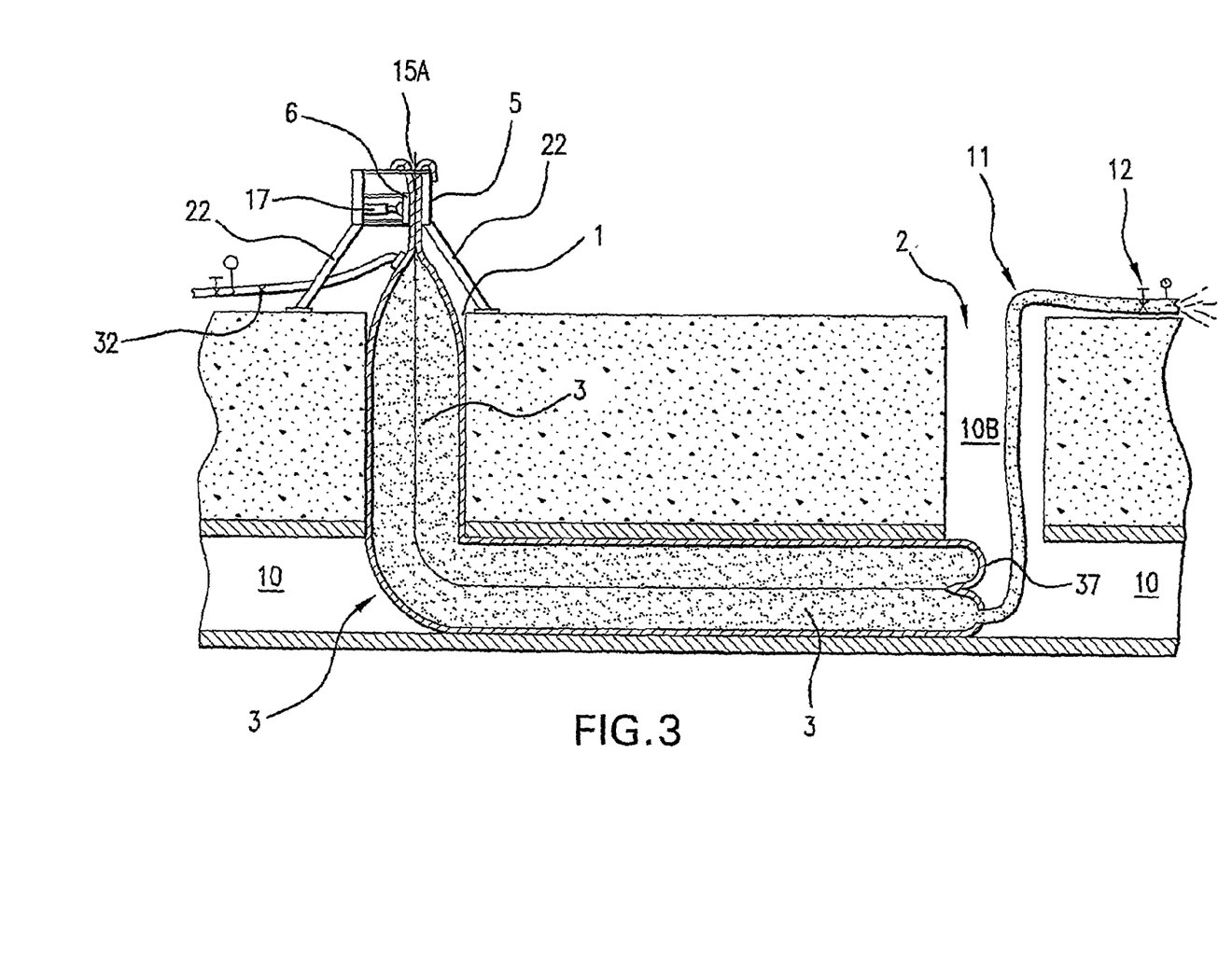
FIG. 3 is an illustration of the system of the invention including the apparatus shown in FIG. 1A and an illustration of the a third stage of the method of the invention.
Figure 4:
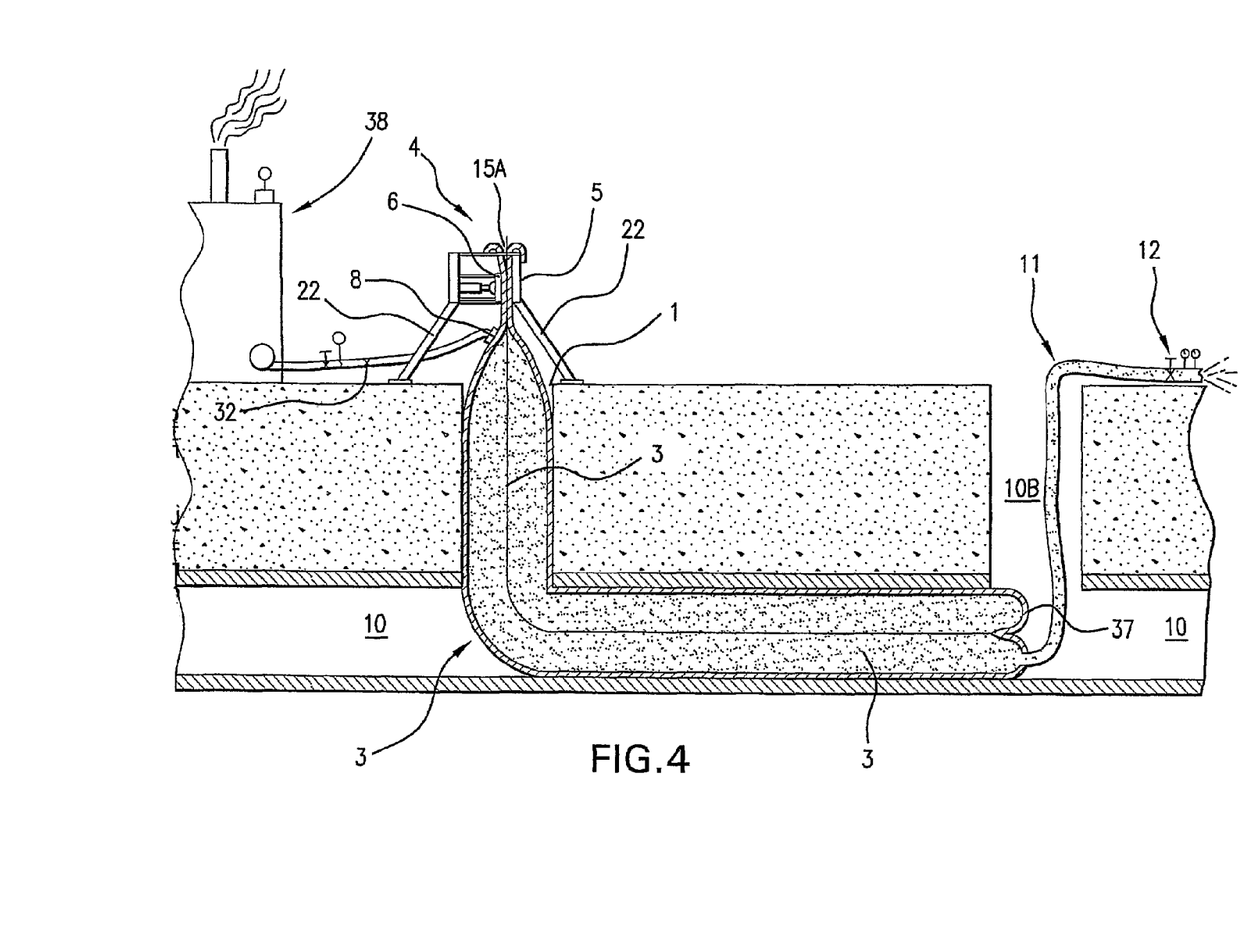
FIG. 4 is an illustration of a fourth stage of the method of the invention, using the apparatus and system shown in FIGS. 1A and 3 and the conduit shown in FIG. 1B.

In the specific embodiment shown in FIGS. 1A, 3 and 4, apparatus 4 includes a supporting frame 18 having an upper platform member 19, a middle platform member 20, a lower platform member 21, first and second substantially vertical support members 5 and 22, respectively, attached to and supporting platform members 19, 20 and 21, and a movable member 6 disposed between and attached to the middle and lower platform members 20 and 21. Frame 18 is preferably supported by a plurality of adjustable legs 22 (FIGS. 2-4) for supporting the apparatus.

Member 6 is movably attached to middle platform member 20 by fitting within a sleeve-like socket or bearing 23 and movably attached to lower horizontal member 21 at sleeve-like socket or bearing 24. Using bearings 23 and 24, member 6 is movable in direction in direction X (see FIG. 1A) along platform members 20 and 21, respectively. Liner-closing member 17 is preferably a piston, which moves member 6 along platform members 20 and 21 toward and away from member 5. Piston 17 is disposed between middle platform member 20 and lower platform member 21. Piston 17 can be moved either manually or by means of a first control valve 7.

Middle platform member 20 is preferably disposed equidistantly from upper and lower platform members 19 and 21, respectively, and is attached to first and second support members 5 and 22 via sleeve-like sockets or bearings 25 and 26, respectively. As pointed out above, middle platform member 20 is also attached to member 6 via bearing 23. Lower platform member 21 is attached to first and second support members 5 and 22 via sleeve-like sockets or bearings 27 and 28, respectively, and is also attached to member 6 via bearing 24.

First control valve 7 is disposed on the lower platform member 21 and is adapted to actuate or cause movement of the piston along the middle and lower platform members. The control valve is preferably disposed in communication with pressure sensors 29 and 30.

Gas-inlet connector 8 is disposed for fluid communication with a gas-inlet port 31 formed in liner 3, as discussed below. Connector 8 is used to connect the gas-inlet port 31 to a gas hose 32 which blows gas, preferably air or steam, through gas-inlet port 31 into the interior of the liner during inversion of the liner. Gas hose 32 preferably includes a check valve 33 for opening and closing the hose. Gas hose 32 is also preferably connected to a lubricating member 34 for lubricating the liner.

Figure 5:
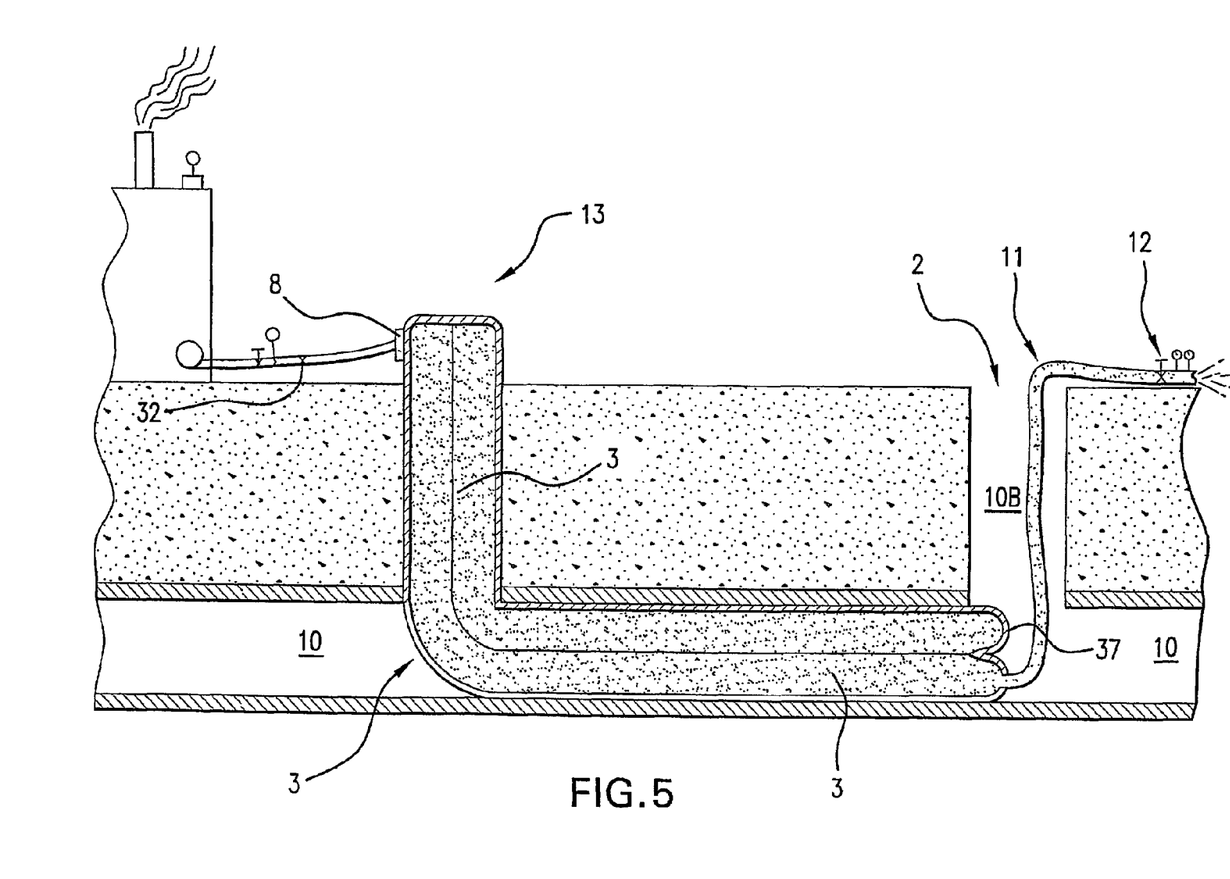
FIG. 5 is an illustration of a fifth stage of the method of the invention, using the apparatus and system shown in FIG. 1A and 3 and the conduit shown in FIG. 1B.

The system of this invention includes apparatus 4 in combination with a second or post-inversion control valve 12 for controlling flow of air through the liner once the liner has been fully inverted in the conduit, and a hose 11 disposed for attachment to the fully inverted liner so as to provide a substantially liquid-tight seal between the fully inverted liner and the second control valve (see FIGS. 3-5). Control valve 12 is preferably a gate valve, and hose 11 is preferably a high temperature and reinforced pressure hose.

FIGS. 1-5 also illustrate the use of apparatus 4 to line conduit 10, e.g., a sewer pipe. Conduit 10 is reached via manholes 1 and 2. FIG. 1A shows liner tube 3 attached to apparatus 4 in preparation for installation within conduit 10. As discussed above, liner tube 3 is formed of a resin absorbent fabric or dry impregnated fabric with a synthetic thermosetting resin and has a length that is equal to or greater than the distance between manholes 1 and 2. Liner can be installed in increments of about 1000 or 2000 feet depending upon conduit dimensions, logistics and physical and weight demands.

As can be seen in FIG. 1A, a leading end 3A of liner 3 is turned inside out for the first few feet to form a cuff 15 which is pulled back over upper platform member 19 and the folded edge 15B of the cuff is secured to securing element (preferably a clamp) 14 disposed on the top of platform member 19. The specific arrangement and design of the cuff is a matter of choice to those skilled in the art. Cuff 15 has an opening 15A through which liner 3 is fed. Cuff 15 is disposed above first manhole 1 of conduit 10. Gas-inlet port 31 is formed in the cuff downstream of opening 15A and downstream of piston 17.

While feeding the remainder of liner 3 through cuff opening 15A, gas, which is preferably air or steam, is introduced from gas-hose 32 through connector 8 and through gas-inlet port 31 into a space 35 defined between cuff 15 and the remainder of liner 3, space 35 being disposed in the interior (shown in broken lines) of the cuff. The gas is fed into space 35 under pressure (e.g., from about 0 to about 30 psig) of liner 3. A 48" diameter conduit requires gas at 3-4 psig while an 8" diameter conduit requires gas at 20-25 psig. Increased pressures are required to invert liner in smaller conduits. The gas introduced through port 31 is blown in so as to exert pressure against bottom 37 of liner 3, thereby causing inversion and inflation of liner 3 in conduit 10.

After a portion of the liner (preferably about one-half) has been inverted in conduit 10, the piston 17 is actuated to bring members 5 and 6 together so as to seal off a region 36 of cuff 15 and liner 3 that is disposed upstream of gas-inlet port 31. The piston 17 may be actuated either manually or by using control valve 7 in an automatic mode (open/close time or pressure function). The use of control valve 7 substantially restricts the escape of gas provided through connector 8. By controlling the loss of gas escaping through a sealed region 36, the process of inversion towards access point 1 and then through conduit 10 towards access point 2 is achieved (see FIG. 1B).

Before a trailing end 3B of the liner is fed through the opening 15A of the cuff, the trailing end is preferably sealed off by a second liner-sealing member (not shown) to prevent loss of gas therethrough.

In the second stage of the method of this invention, as illustrated in FIG. 2, at the halfway point of the inversion of the liner tube 3 between access points 1 and 2, the piston is actuated to bring members 5 and 6 together to seal off region 36, so that gas introduced via connector 8 is substantially prevented from escaping to atmosphere through the sealed off area while still permitting the liner to pass therethrough. Gas supplied through connector 8 is forced by the sealing off of region 36 to flow through the interior of the liner, thereby pushing the bottom surface 37 of the liner forward. This movement in turn causes the liner to invert.

In the third stage of the method of this invention, as illustrated in FIG. 3, after the inversion has been completed in its entire length, second control valve 12 and hose 11 are positioned at access point 2. Control valve 12 is preferably a standard gate valve, and hose 11 is preferably a high temperature and reinforced pressure hose. Hose 11 is attached to the liner tube 3 and provides a substantially fluid-tight seal between inside the liner and control valve 12. On closure of control valve 12, the flow of gas through the liner 3 now inside out or fully inverted in the conduit is restricted.

In a fourth stage of the method of this invention, illustrated in FIG. 4, once the volume of the liner tube 3 or the pressure of fluid flowing through connector 8 has reached the optimum pressure required to keep the liner tight against the inside walls of conduit 10, the liner will eventually cure under ambient conditions to form a new structure within conduit 10. Optionally, a source of heat 38 can be applied through connector 8 relieving itself via the control valve 12, thereby speeding up the curing process.

After curing of the resin is completed, the leading and trailing ends of the cured liner are sealed to the inside walls of the conduit so as to prevent seepage or leakage of water or other fluid between the liner and conduit.

In an optional fifth stage of the method of this invention, illustrated in FIG. 5, once the liner tube 3 is fully in position within conduit 10 and at the same time that hose 11 and control valve 12 are being positioned, apparatus 4 may be removed and a control blank plate 13 can be positioned, allowing apparatus 4 to be used in another location, and stage 4 can continue as previously described.

Once the liner is cured in place, it may be necessary to cut openings for other conduits which intersect or join with it. This can be done using a conventional motorized cutter that can travel the conduit liner to make appropriate openings. The device can include a camera to view and record the cured liner. The ends or openings of the liner can be sealed to the conduit using conventional sealants.

Figure 6:
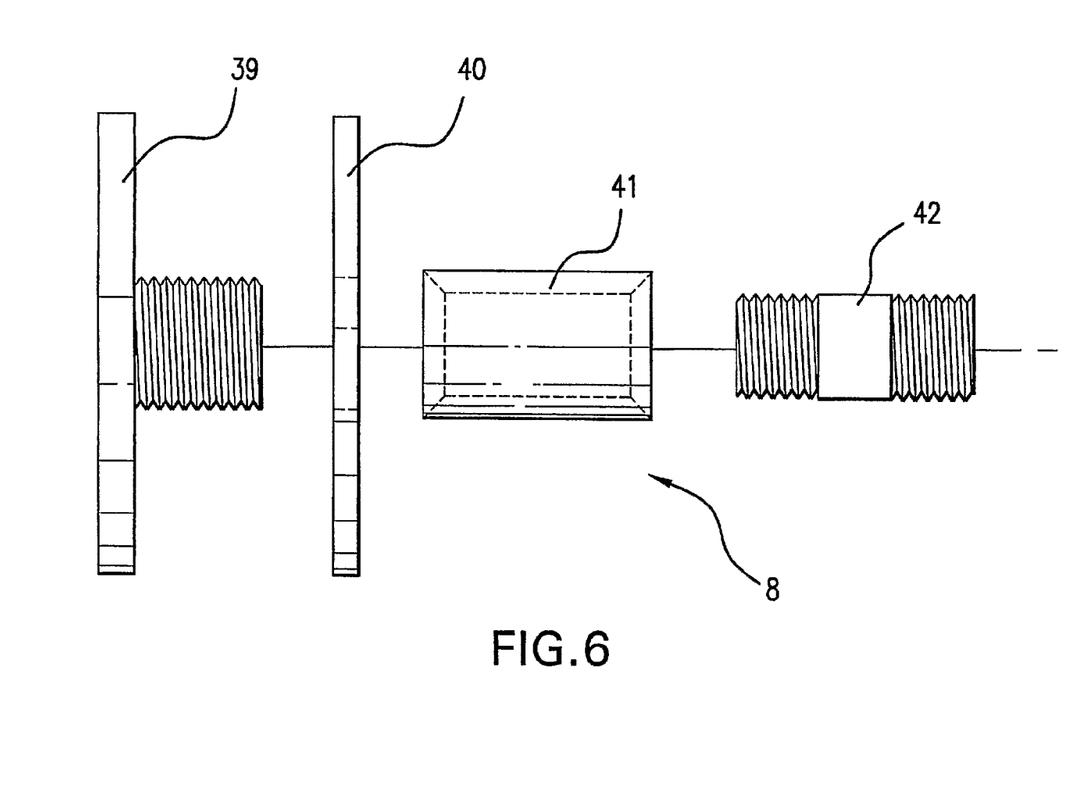
FIG. 6 shows a schematic view of connector 8, used in the apparatus of this invention.

FIG. 6 shows connector 8 for injection of gas during the insertion and curing of liner 3. It is an exploded schematic representation of connector 8 shown in FIG. 1A after its construction and connection with air source 34. The connector shown in FIG. 6 comprises four separate parts. Element 39 is a base with a threaded portion through which gas flows. Element 40 is a disc which slips over the threaded portion of element 39. The threaded portion slips in the hole of element 40. Optionally, the hole can be threaded. Locking nut 41 has internal threads which clamp liner 3 punctured to accommodate the threaded portion of element 39, liner 3 being situated between elements 39 and 40, as shown in FIG. 1A. The surface of element 40 abutting liner 3 is knurled to facilitate clamping liner 3 in place. Nipple 42 is inserted in locking nut 41 and provides a means to attach a gas source to connector 8.

The apparatus of the present invention has been described with regard to a specific embodiment. The concept present is in essence a simplification of known processes, in particular those directed to fluid (e.g., water) processes. The present design encapsulates gas to lay liner in conduit. Material to the design is the gas inlet made in a stationary portion of the liner itself located below the opening through which liner is inverted. The apparatus is a basic design of a mechanism to hold one end of a liner while the liner is being inserted into conduit which is to be lined. A gas is injected through a port made in the liner after the end being held in place, and gas is charged to an annular space formed by the liner itself while it is being inverted upon itself. The end through which the invention takes place is closed sufficiently to avoid escape of gas and promote movement of liner into the conduit. Conventional mechanisms are utilized, for example, mechanical feeding apparatus like rotating cylinder to move the liner, conventional control elements, known mechanisms to open or close the end of the liner being inverted, i.e., pistons or other closure tools, and connector for the gas inlet. The choice of mechanism is not as important as their sequencing and arrangement.

The system of the present invention evolves about the described apparatus. It includes equipment to impregnate liner material and to help eliminate entrainment of air, if necessary. The system cam include refrigeration equipment for impregnated liner to inhibit catalysis of resin and assist in storage and transport of impregnated liner. Additionally, apparatus to pressurize gas or air used in the process and to make steam or heat the gaseous material.

The dimensions and design of the liner can accommodate existing conduits for municipal, transportation, fluid purification, drainage utilities. This can include dimensions in feet and yards perhaps limited by the strength of the liner material relative to its weight and resistance to effects of gas pressure need to conform the shape of the liner to the conduit being lined.

EXPERIMENTAL

EXAMPLES 1-4

The following examples describe specific methods within the scope of the present invention for lining or rehabilitating a sewer pipeline. Each of the methods used a lining apparatus within the scope of the present invention. In each Example, prior to lining, the sewer pipeline was temporarily removed from service (i.e., bypassed) by plugging the pipeline one section upstream of the work area and pumping all flows overland to one section downstream of the work area. The pipeline to be lined was cleaned prior to installation of the liner.

Example 1

The sewer pipeline lined in Example 1 had a diameter of 33 inches and a length of 854 feet.

The liner was a polyester liner impregnated (saturated) with a polyester thermosetting resin and having a thickness of 16 millimeters. During the impregnation process, the entire liner was loaded into a refrigeration vehicle for transport to the site of the pipe to be lined. The combined weight of the liner and the resin was 27,755 pounds.

Once the liner had been transported to the work area, and the equipment set up, the first 10-15 feet of the liner was pulled from the refrigeration truck and over a top roller of the lining apparatus located above the manhole opening of the sewer pipeline.

The liner was situated down through open jaws or clamp of the lining apparatus. The first few feet of the liner was already turned inside out. The liner was then fixed in position, and a connector within the scope of the present invention which was previously attached to the liner was then connected to a pressure supply line. After this, the jaws were put into the closed position, and the pressure valve was opened, thereby allowing pressure to build up inside the exposed liner and causing the liner to expand into a round pipe shape. The jaws were adjusted fractionally and the pressure maintained at 2-5 pounds per square inch (psi). The liner begins to invert. Simultaneously, remaining liner in the truck is pulled down from the truck and over the top roller of the lining apparatus.

Inversion of the liner continued until the liner inverted down into the manhole opening in a vertical position and reached the floor of the manhole. When the inverted liner reached the manhole floor, the pressure valve was switched off, and the jaws were opened to allow trapped air to escape to atmosphere. This allowed an operator of the apparatus to verify that the liner had reached the manhole floor.

An operator was lowered into the manhole to attach a turn rope to the liner material. A "turn rope" is a knotted rope threaded into one or more outside layers of the liner. It should be noted here that if the conventional method of using water as the means for exerting pressure, the water would have to be removed first before the operator could enter the manhole. The turn rope was then pulled vertically, this movement causing the liner to be repositioned from a vertical position to a horizontal position, thereby allowing the inversion of the liner to continue horizontally through the pipeline. Repositioning the liner from a vertical position to a horizontal position generally takes about 8 to 10 minutes.

After repositioning the liner, the operator leaves the manhole. The clamp is then closed and the pressure turned on, thereby permitting the process to continue. After approximately 8 to 10 minutes, the halfway stage of the process is reached. At this stage, all or nearly all of the liner has passed into the sewer pipeline, and the liner has been inverted approximately half the way through the length of the pipeline. After the end of the liner has passed through the jaws, the jaws are fully closed.

By monitoring a pressure gauge, the operator can easily identify the inversion process because an increase in pressure means the liner has stopped inverting.

Once the liner inverts (i.e., turns inside out) and the outside layers of the liner are stretched to the pipeline wall, the combined restriction of the jaws at the entry point of the apparatus and the internal pipeline wall will cause the liner to stretch at the inversion face, which in turn causes the liner to invert through itself.

Within three minutes of fully closing the jaws, the liner reached its destination at the other end of the pipeline. An operator then connected a control valve station and temperature thermal wires to a temperature monitor. Via radio communication between an operator at the inversion entry point and an operator at the control valve station, pressure and temperature readings are adjusted and recorded for the entire liner, which is now completely in place.

Once the operators had established the correct air pressure, steam was then introduced into a supply line, which increased the internal temperature of the liner to a point that would cause an exothermic reaction to occur, which in turn ensures that the soft, flexible, saturated resin layer becomes a hard fixed pipe within the pipe.

Once the liner is cured in place, the steam is switched off and the internal liner cooled to a temperature of about 120° F. Excess liner at both ends was cut off.

Example 2

The sewer pipeline lined in Example 2 had a diameter of 54 inches and a length of 421 feet.

The liner was a polyester liner impregnated (saturated) with a polyester thermosetting resin and having a thickness of 25 millimeters. During the impregnation process, the entire liner was loaded into a refrigeration vehicle for transport to the site of the pipe to be lined. The combined weight of the liner and the resin was 34,853 pounds. A turn rope was attached to the liner after the impregnation process was completed and before the final 15 feet of the liner had been loaded into the refrigeration truck.

Once the liner had been transported to the work area, and the equipment set up, the first 10-15 feet of the liner was pulled from the refrigeration truck and over a top roller of the lining apparatus. The apparatus was located above the shaft entrance of the sewer pipeline.

The liner was situated down through open jaws or clamp of the lining apparatus. The first seven feet of the liner was already turned inside out. The liner was then fixed in position, and a connector within the scope of the present invention which was previously attached to the liner was then connected to a pressure supply line. After this, the jaws were put into the closed position, and the pressure valve was opened, thereby allowing pressure to build up inside the exposed liner and causing the liner to expand into a round pipe shape. The jaws were adjusted fractionally and the pressure maintained at 2-5 psi. The liner begins to invert. Simultaneously, remaining liner in the truck is pulled down from the truck and over the top roller of the lining apparatus.

Inversion of the liner continued until the liner inverted down into the manhole opening in a vertical position and reached the floor of the manhole. When the inverted liner reached the manhole floor, the pressure valve was switched off, and the jaws were opened to allow trapped air to escape to atmosphere. This allowed an operator of the apparatus to verify that the liner had reached the manhole floor.

The turn rope was then pulled vertically, this movement causing the liner to be repositioned from a vertical position to a horizontal position. The jaws were then closed and the pressure turned on, thereby permitting the process to continue. After approximately 12 minutes, the halfway stage of the process is reached. At this stage, all or nearly all of the liner has passed into the sewer pipeline, and the liner has been inverted approximately half the way through the length of the pipeline. After the end of the liner has passed through the jaws, the jaws are fully closed.

As noted above, by monitoring a pressure gauge, the operator can easily identify the inversion process because an increase in pressure means the liner has stopped inverting.

Once the liner inverts (i.e., turns inside out) and the outside layers of the liner are stretched to the pipeline wall, the combined restriction of the jaws at the entry point of the apparatus and the internal pipeline wall will cause the liner to stretch at the inversion face, which in turn causes the liner to invert through itself.

Within five minutes of fully closing the jaws, the liner reached its destination at the other end of the pipeline. An operator confirmed this using radio communication. The air supply was then turned off. Due to other construction activities in the area, the operators then removed the lining apparatus from its location and connected a control valve station to the connector that was still attached to the liner and a set of clamps to the end of the liner. Similarly, at the destination manhole, an operator carried out the same operation. Once completed and via radio communication, air was reintroduced from the other end (destination manhole).

Once the operators had established the correct air pressure, steam was then introduced into a supply line at the destination end and vented through the connector and valve control station at the inversion end, which increased the internal temperature of the liner to a point that caused an exothermic reaction to occur, which in turn ensured that the once soft and flexible, saturated resin layers to become a hard fixed pipe within a pipe.

Once the liner is cured in place, the steam is switched off and the internal liner cooled to a temperature of approximately 120° F. Excess liner at both ends was cut off and removed.

Example 3

The sewer pipeline lined in Example 3 had a diameter of 36 inches and a length of 300 feet.

The liner was a polyester liner impregnated (saturated) with a polyester thermosetting resin and having a thickness of 22.5 millimeters. During the impregnation process, the entire liner was loaded into a refrigeration vehicle for transport to the site of the pipe to be lined. The combined weight of the liner and the resin was 14,907 pounds.

Once the liner had been transported to the work area, and the equipment set up, the first 10-15 feet of the liner was pulled from the refrigeration truck and over a top roller of the lining apparatus. The apparatus was situated at the rear end of a specially modified boiler truck having a hydraulic mast capable of moving up and down similar to a forklift. The boiler truck was positioned immediately above the manhole opening of the downstream manhole to the sewer pipeline. Thus, in Example 3, the installation process was reversed and the liner was inverted uphill.

The liner was situated down through open jaws or clamp of the lining apparatus. The first seven feet of the liner was already turned inside out. The liner was then fixed in position, and a connector within the scope of the present invention which was previously attached to the liner was then connected to a pressure supply line. After this, the jaws were put into the closed position, and the pressure valve was opened, thereby allowing pressure to build up inside the exposed liner and causing the liner to expand into a round pipe shape. The jaws were adjusted fractionally and the pressure maintained at 5-8 psi. The liner begins to invert. Simultaneously, remaining liner in the truck is pulled down from the truck and over the top roller of the lining apparatus.

Inversion of the liner continued until the liner inverted down into the manhole opening in a vertical position and reached the floor of the manhole. When the inverted liner reached the manhole floor, the pressure valve was switched off, and the jaws were opened to allow trapped air to escape to atmosphere. This allowed an operator of the apparatus to verify that the liner had reached the manhole floor.

The first 10-15 feet of the liner was dry tube (i.e., no resin saturation). Once it was established that the liner had reached the manhole floor, the hydraulic mast was moved upward, leaving a gap between the inversion face of the liner and the manhole floor. The process of inversion was allowed to continue until sufficient material had entered into the manhole to make the turn from the vertical position into the horizontal position in order to enter the pipeline. Air pressure was then turned off, and the jaws opened to allow the trapped air to escape to atmosphere. Having established that there was both sufficient material now turned inside out into the manhole and that the resin could be seen from the exposure of the saturated liner, the operator of the apparatus then lowered the hydraulic mast approximately 3-4 feet, allowing the liner's first few feet to be in the horizontal position, with the remainder of the liner hanging vertically. This mast movement caused the liner to rest upon the manhole floor, and directed the inversion face toward the pipeline entranceway (turning through 90 degrees). The jaws were then closed and the pressure turned on, thereby permitting the process to continue. After approximately 6 minutes, the halfway stage of the process is reached. At this stage, all or nearly all of the liner has passed into the sewer pipeline, and the liner has been inverted approximately half the way through the length of the pipeline. After the end of the liner has passed through the jaws, the jaws are fully closed.

As pointed out before, by monitoring a pressure gauge, the operator can easily identify the inversion process because an increase in pressure means the liner has stopped inverting. A sudden decrease in pressure would indicate the liner had reached its destination if the liner was not sealed off at the end.

Once the liner inverts (i.e., turns inside out) and the outside layers of the liner are stretched to the pipeline wall, the combined restriction of the jaws at the entry point of the apparatus and the internal pipeline wall will cause the liner to stretch at the inversion face, which in turn causes the liner to invert through itself.

Within two minutes of fully closing the jaws, the liner reached its destination at the upstream end of the pipeline. An operator confirmed this using radio communication. The air supply was then turned off. An operator then connected a control valve station and temperature thermal wires to a temperature monitor. Via radio communication between an operator at the inversion entry point and an operator at the control valve station, pressure and temperature readings are adjusted and recorded for the entire liner, which is now completely in place.

Once the operators had established the correct air pressure, steam was then introduced into a supply line at the inversion end and vented to atmosphere at the upstream end, through the connector and valve control station, which increased the internal temperature of the liner to a point that caused an exothermic reaction to occur, which in turn ensured that the once soft and flexible, saturated resin layers to become a hard fixed pipe within the pipe.

Once the liner is cured in place, the steam is switched off and the internal liner cooled to a temperature of approximately 120° F. Excess liner at both ends was cut off and removed.

Example 4

The sewer pipeline lined in Example 4 had a diameter of 24 inches and a length of 300 feet.

The liner was a polyester liner impregnated (saturated) with a polyester thermosetting resin and having a thickness of 15 millimeters. The closest access point to the manhole entrance was about 125 feet away from the lining apparatus. Thus, the liner was approximately 425 feet in length, with only about 300 feet being saturated with resin.

During the impregnation process, the entire liner was loaded into a refrigeration vehicle for transport to the site of the pipe to be lined. The combined weight of the liner and the resin was 6640 pounds.

Once the liner had been transported to the work area, and the equipment set up, the first 10-15 feet of the liner was pulled from the refrigeration truck and over a top roller of the lining apparatus. The apparatus was situated at the rear end of a specially modified boiler truck having a hydraulic mast capable of moving up and down similar to a forklift. The boiler truck was positioned approximately 120 feet away from the manhole opening to the sewer pipeline. The reason for the truck's distance from the manhole opening was the presence of a dry creek riverbed located 20 feet below the top of the manhole and running parallel to the pipeline. Access to the other side of the manhole was impossible because of the presence of a large railway track also running parallel to the pipeline.

The liner was situated down through open jaws or clamp of the lining apparatus. The first seven feet of the liner was already turned inside out. After this, the jaws were put into the closed position, and the pressure valve was opened, thereby allowing pressure to build up inside the exposed liner and causing the liner to expand into a round pipe shape. The jaws were adjusted fractionally and the pressure maintained at 8-10 psi. The liner begins to invert. Simultaneously, remaining liner in the truck is pulled down from the truck and over the top roller of the lining apparatus.

Inversion of the liner continued until the liner inverted along a trail above ground and then down into the creek riverbed and up a steep incline to the manhole entrance. The liner was inverted past the manhole entrance for several feet until it was established that there was sufficient material above ground to be capable of reaching the manhole floor once the liner was repositioned. An operator also established that there was sufficient wet resin being exposed inside out so that when resituated, the dry liner would not be inside the pipe. The pressure valve was switched off, and the jaws were opened to allow trapped air to escape to atmosphere. This allowed operators of the apparatus to manually lift the liner and lower it into the manhole so that the exposed inversion face of the liner was placed into the pipeline entrance for several inches. The jaws were then closed and the pressure turned on, thereby permitting the process to continue. After approximately 20 minutes, the halfway stage of the process is reached. At this stage, all or nearly all of the liner has passed into the sewer pipeline, and the liner has been inverted approximately one-third of the way through the length of the pipeline. After the end of the liner (which in this application was sealed around a connector) had passed through the jaws, the jaws are fully closed.

By monitoring a pressure gauge, the operator could identify the inversion process because an increase in pressure indicates that the liner has stopped inverting. In this application, an operator also monitored the downstream location manhole and signaled, via radio communication, that the liner had reached its destination, and the liner sealed off and in the correct position at the end.

Once the liner inverts (i.e., turns inside out) and the outside layers of the liner are stretched to the pipeline wall, the combined restriction of the jaws at the entry point of the apparatus and the internal pipeline wall will cause the liner to stretch at the inversion face, which in turn causes the liner to invert through itself.

Within ten minutes of fully closing the jaws, the liner reached its destination point at the end of the pipeline. An operator confirmed this using radio communication. The air supply was then reduced in pressure to allow the operator to safely connect a control valve station and temperature thermal wires to a temperature monitor. Via radio communication between an operator at the inversion entry point and an operator at the control valve station, pressure and temperature readings are adjusted and recorded for the entire liner, which is now completely in place.

Once the operators had established the correct air pressure, steam was then introduced into a supply line at the inversion end and vented to atmosphere at the upstream end, through the connector and valve control station, which increased the internal temperature of the liner to a point that caused an exothermic reaction to occur, which in turn ensured that the once soft and flexible, saturated resin layers to become a hard fixed pipe within the pipe.

Once the liner is cured in place, the steam is switched off and the internal liner cooled to a temperature of approximately 120° F. Excess liner at both ends was cut off and removed.

The apparatus and method of this invention can be used for the installation of any cured-in-place product or pre-liner or dry liner tube (non-resin-saturated liner) into any conduit (e.g., manhole, pipeline, or vertical shaft) used to convey fluids or gas. In the method of the present invention, the length of time required for curing the liner will depend on a variety of factors, such as, e.g., soil temperature, the material constituting the liner, the material making up the particular conduit being lined (e.g., brick, concrete, clay, plastic, iron, et al.), the heat conductivity of the material making up the conduit being lined, the particular groundwater conditions, the dips and sags present within the conduit being lined, the thickness of the liner, the size and capacity of the air supply, the size and capacity of the power source of steam units used, the size of air dryer or steam trap, as well as the size of pipe supply and control valve, and flow direction. The particular resin used to impregnate the liner also affects curing times. For example, thermosetting polyester, vinyl ester and epoxy resins will be used in different amounts and will use different catalysts (thermosetting resins are all mass critical).

The foregoing description of the invention is thus illustrative and explanatory, and various changes in the equipment, as well as in the details of the methods and techniques disclosed herein may be made without departing from the spirit of the invention, which is defined by the claims.

What is claimed is:

1. A system for inverting a liner in a passageway, the system comprising:
    an apparatus disposed outside of a passageway, the passageway having a first access point and a second access point, the apparatus for inverting a portion of a liner and including members disposed on either side of the liner;
    a connector attached to a portion of the liner disposed outside of the passageway, the connector through which one or more of air or fluid flows, and the members brought together to seal off any loss of one or more of air or fluid through the connector upstream the connector; and
    a control valve and a hose disposed at the second access point of the passageway, the hose attached to a second end of the liner when the second end of the liner is disposed within the passageway below the second access point of the passageway;
    one or more of air or fluid is supplied through the connector, the liner is pushed through the first access point of the passageway to the second access point of the passageway, and an opening of the apparatus can be adjusted, which can slow or speed up the process of inverting the liner through and into the passageway and, after inversion of the liner has been completed, operation of the control valve restricts the flow of one or more of air or fluid through the liner at the second end of the liner.

2. The system of claim 1, the control valve comprising a standard gate valve, and the hose comprising a high temperature and reinforced pressure hose.

3. The system of claim 2, the hose providing a seal between the liner and the control valve.

4. The system of claim 1, wherein an opening of the apparatus is an entrance point of the apparatus.

5. The system of claim 1, wherein the connector is attached to a portion of the liner after a first few feet of the liner is exposed inside out from an exit point of the apparatus.

6. The system of claim 1, wherein one or more of air of fluid is supplied through the connector with the apparatus in a closed position.

7. The system of claim 1, the apparatus further comprising an entrance and an exit point, wherein the liner is drawn through the entrance to allow the first few feet of the liner to be exposed inside out from the exit point of the apparatus.

* * * * *